INVENTOR
Lawrence R. Buckendale
BY Strauch, Nolan & Diggins
ATTORNEYS

United States Patent Office 2,765,876
Patented Oct. 9, 1956

2,765,876

BRAKE ADJUSTMENT

Lawrence R. Buckendale, Detroit, Mich., assignor, by mesne assignments, to Rockwell Spring and Axle Company, Coraopolis, Pa., a corporation of Pennsylvania Application April 7, 1950, Serial No. 154,624

1 Claim. (Cl. 188—79.5)

This invention relates to novel vehicle wheel brake adjustments and is particularly directed to improved details in such brake adjustment mechanism.

Although most hydraulic and air brake assemblies in general use today include provisions for equalizing brake action, each brake assembly having pivoted shoes embodies mechanism for manually adjusting these pivots to determine the drum to shoe clearances and to compensate for individual lining wear. The present invention concerns a special rugged and sturdy weatherproof arrangement for supporting and adjusting the brake shoe pivot axes which is readily accessible through the brake backing plate.

The major object of my invention is to provide a novel brake shoe pivot adjustment which is easy to manipulate and readily available but which is rugged and reliable and weatherproof.

A further object of the invention is to provide a novel individual adjustment mechanism for a longitudinally slidable member to which the brake shoe is rockably connected.

A further object of the invention is to provide a brake wherein the brake shoe assemblies are pivoted upon slidable members whose positions are determined by novel readily adjustable stop arrangements.

Further objects of the invention will appear as the description proceeds in connection with the appended claims and the annexed drawings wherein:

Figures 1, 2, 3, 4:
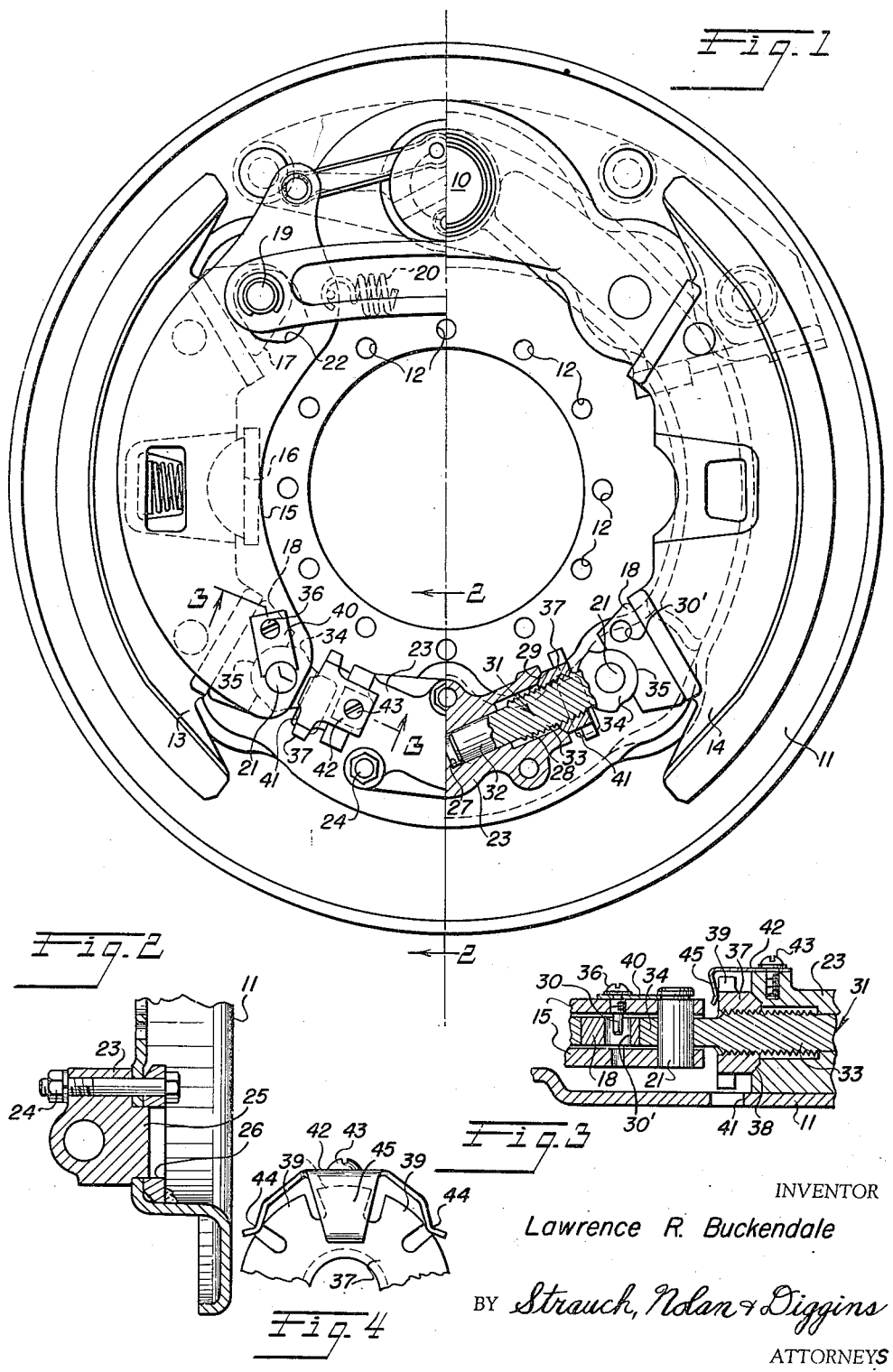
Figure 1 illustrates a side elevation of a brake assembly embodying a preferred form of the adjustment of the invention partially broken away in section to illustrate details of the adjustment.
Figure 2 is an enlarged fragmentary view along the line 2—2 of Figure 1 illustrating how the adjustment support member is mounted on the brake backing plate.
Figure 3 is a section on line 3—3 of Figure 1 illustrating further the details of the adjustment.
Figure 4 is a fragmentary end view of the nut retainer plate.

The brake comprises a backing plate 11 for supporting the entire internally expanding brake mechanism and the operator therefor upon the axle. In practice plate 11 is secured, as by rivets passing through a series of holes 12, to a suitable radial flange formed on the axle so that it is rigid and non-rotatable with the axle. A cam or like mechanism for operating the brake shoes is illustrated at 10 as mounted on plate 11 and this may be the same as that illustrated in Buckendale et al. Patent 2,435,955, issued February 17, 1948. Opposite and identical brake shoes 13 and 14 are rockably and slidably connected to brake levers 15 through a central pressure block and saddle bar assembly indicated at 16. Such an assembly of the brake shoes and levers is disclosed in Buckendale Patent 2,432,983, issued December 23, 1947, to which reference is made for more detail if needed.

Upper and lower abutment blocks 17 and 18 slidably engaging the opposite ends of the brake shoes are rockably mounted for movement about the axes of upper and lower anchor pins 19 and 21 respectively. The upper anchor pins 19 are fixed to the plate 11, slots 22 being provided in levers 15 to enable pivotal movement of the levers about lower anchor pins 21 during brake operation. A tension spring 20 interconnects levers 15 adjacent their non-pivoted ends and urges them toward brake retracted position.

In the above mentioned patents, the lower anchor pins are rotatably mounted directly on the brake backing plate or spider and are formed with eccentrics on which the lower abutments are pivoted, so that rotation of the lower pins results in adjustment of the brake shoe pivot axis. In the present invention, both of the lower anchor pins 21 are mounted upon an adjustment support member 23 which, as illustrated in Figure 2, is secured removably but rigidly and non-rotatably upon plate 11 as by three bolts 24. As also illustrated in Figure 2, the rear portion of support 23 is formed with a boss 25 that fits into a piloting aperture 26 in the reenforcing channel of brake backing plate 11 for properly locating it during the assembly. If desired the support 23 could be an integral part of the backing plate.

Both sides of support 23 are identical and symmetrical about the line 2—2 of Figure 1. Each side of support 23 is formed with an upwardly inclined cylindrical bore 27 that is formed near its outer end with an enlarged portion 28 which terminates in a beveled annular smooth seat 29. Mounted within the bore 27—28 is a pivot support member 31 that has a lower cylindrical portion 32 slidable within smaller bore 27 and an outer threaded portion 33 that passes freely through bore 28 and seat 29. Pivot support member 31 is formed beyond threaded portion 33 with an enlarged head 34 that has an arcuate surface 35 for rockably receiving the lower brake shoe abutment block 18. The center of arc 35 is the axis of pin 21. Abutment block 18 thus rocks about the axis of the lower anchor pin 21 which is non-rotatably secured to head 34 and projects from opposite sides of head 34. As illustrated in Figure 3, the spaced arms of each lever 15 embrace abutment 18 and head 34 and are pivotally connected to anchor pin 21. A spring clip 40 secured to lever 15 as by a screw 36 engages a grooved extension of pin 21 to prevent axial separation of the pin and lever 15. Preferably members 31 are made of steel treated to be corrosion and weather resistant.

As illustrated in Figure 3, screw 36 is formed with a cylindrical projection 30 that extends within a larger cylindrical aperture 30' in abutment block 18. This arrangement retains block 18 in assembled relation with lever 15 but at the same time permits limited relative motion between lever 15 and block 18 during brake operation.

A nut 37, which is preferably made of bronze so as to be resistant to moisture and corrosion, is threadedly and rotatably mounted upon the threaded portion 33 of member 31 just outwardly of bore 28 of the support, and nut 37 is formed with a smooth beveled inner surface 38 for piloting and seating upon beveled surface 29 of the support bore. Since member 31 is freely slidable longitudinally of the bore 27, rotation of nut 37 which has smooth bearing engagement with seat 29 results in longitudinal displacement of member 31 and hence in adjustment of the associated anchor pin 21.

In the assembly, therefore, seat 29 serves as a stop cooperating with an adjustable stop nut 37 for limiting inward displacement of member 31 which is urged toward the stop seat 29 by the weight of the lever and shoe assemblies and the cam connections at operator 10. The bronze nut 37 does not freeze either to the threads at 33 or to the seat 29 and is always ready for rotation.

Nut 37 is formed with a row of serrations 39 that (Figure 3) are accessible from the inside of the vehicle wheel through a slot 41 in backing plate 11.

A spring plate 42, secured upon support 23 as by screws 43, extends over the side of the nut opposite slot 41 and has side arms formed with detents 44 adapted to engage the serrations of nut 37. An integral spring tongue 45 extends over and frictionally bears on the side face of nut 37. This restrains axial outward movement of member 31 in the assembly. As nut 37 is rotated these serrations indicate increments of rotation by the sense of touch and by a clicking noise, and they also function to retain the adjustment of nut 37 in the assembly.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In a brake mechanism, a support adapted to be removably secured on a brake mechanism mounting plate and having two angularly disposed bores each terminating at its outer end in a substantially conical seat, pivot members mounted for axial displacement in said bores, each of said pivot members having an inner end portion slidably mounted in its bore, a brake shoe assembly pivot portion axially outside the bore, and an externally threaded portion located inwardly of said pivot portion, nuts rotatable on each member at said threaded portion, each nut having a substantially conical seat to bear on the corresponding seat at the outer end of the bore, and means for resiliently restraining axial outward displacement of each of said members in its bore while permitting rotation of said nut to effect brake shoe assembly pivot adjustment.

References Cited in the file of this patent

UNITED STATES PATENTS

| | | |
|---|---|---|
| 1,637,520 | Dodge | Aug. 2, 1927 |
| 1,865,524 | La Brie | July 5, 1932 |
| 2,065,679 | Fisher et al. | Dec. 29, 1936 |
| 2,068,588 | Algee et al. | Jan. 19, 1937 |
| 2,105,297 | Press | Jan. 11, 1938 |
| 2,120,917 | Hause | June 14, 1938 |
| 2,130,857 | Press | Sept. 20, 1938 |
| 2,146,207 | Farkas | Feb. 7, 1939 |
| 2,161,278 | Bowen | June 6, 1939 |
| 2,224,215 | Chartock et al. | Dec. 10, 1940 |
| 2,247,374 | Hawley | July 1, 1941 |
| 2,432,983 | Buckendale et al. | Dec. 23, 1947 |
| 2,435,955 | Buckendale et al. | Feb. 17, 1948 |
| 2,536,410 | Anderson | Jan. 2, 1951 |
| 2,560,551 | Buckendale et al. | July 17, 1951 |

FOREIGN PATENTS

| | | |
|---|---|---|
| 469,911 | Great Britain | Aug. 5, 1937 |
| 778,314 | France | Dec. 22, 1934 |

OTHER REFERENCES

"DP" Brake, Copyright 1949 by the Timken-Detroit Axle Co., Detroit, Michigan.